(12) United States Patent
Chen et al.

(10) Patent No.: US 12,417,037 B1
(45) Date of Patent: Sep. 16, 2025

(54) MAGNETIC DISK APPARATUS AND CONTROL METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yu Chen, Sagamihara Kanagawa (JP); Kenichiro Oozeki, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/809,737

(22) Filed: Aug. 20, 2024

(30) Foreign Application Priority Data

Mar. 8, 2024 (JP) .................... 2024-035580

(51) Int. Cl.
*G06F 3/06* (2006.01)
*G06F 1/3234* (2019.01)
*G11B 19/20* (2006.01)

(52) U.S. Cl.
CPC .......... *G06F 3/0619* (2013.01); *G06F 1/3268* (2013.01); *G11B 19/2081* (2013.01)

(58) Field of Classification Search
None
See application file for complete search history.

(56) References Cited

U.S. PATENT DOCUMENTS

| | | | |
|---|---|---|---|
| 6,295,577 B1 * | 9/2001 | Anderson | G06F 11/1441 714/24 |
| 7,061,707 B2 * | 6/2006 | Fong | G11B 21/12 |
| 8,924,641 B2 | 12/2014 | Trantham et al. | |
| 8,947,813 B2 * | 2/2015 | Chatradhi | G11B 19/2081 714/24 |
| 9,230,593 B1 * | 1/2016 | Nicholls | G11B 19/20 |
| 9,780,700 B2 * | 10/2017 | Lieu | H02J 9/06 |
| 10,635,158 B1 * | 4/2020 | Watanabe | G06F 3/065 |

(Continued)

FOREIGN PATENT DOCUMENTS

| | | |
|---|---|---|
| JP | H09-016338 | 1/1997 |
| JP | H0916338 A | 1/1997 |

(Continued)

*Primary Examiner* — Fred Tzeng
(74) *Attorney, Agent, or Firm* — Knobbe, Martens, Olson & Bear, LLP

(57) ABSTRACT

In a magnetic disk apparatus according to an embodiment, a power supply circuit generates second power from first power supplied by an external power supply, and generates third power when the first power is cut off. The third power is generated based on regenerative energy generated by stoppage of a motor. A controller writes data received from a host device to a magnetic disk via a cache area by the second power while the first power is supplied, and executes a backup process when the first power is cut off. The backup process is executed by disabling communication with the host device and saving content of the cache area to the first memory by the third power. A monitoring circuit keeps connection with the external power supply even when the first power is cut off. The controller enables communication with the host device when the first power is restored.

14 Claims, 6 Drawing Sheets

(56) References Cited

U.S. PATENT DOCUMENTS

| | | | |
|---|---|---|---|
| 10,656,692 B2 * | 5/2020 | Kimura | G06F 3/0625 |
| 10,996,740 B2 | 5/2021 | Watanbe et al. | |
| 11,842,047 B2 * | 12/2023 | Koyama | G06F 3/0619 |
| 2003/0028733 A1 | 2/2003 | Tsunoda et al. | |
| 2015/0244207 A1 * | 8/2015 | Narita | H02J 9/061 |
| | | | 307/64 |
| 2019/0286208 A1 * | 9/2019 | Sogabe | G06F 11/3058 |
| 2020/0225733 A1 * | 7/2020 | Watanabe | G11B 19/2081 |
| 2023/0092423 A1 | 3/2023 | Koyama | |

FOREIGN PATENT DOCUMENTS

| | | |
|---|---|---|
| JP | 2008-282137 | 11/2008 |
| JP | 2008-282137 A | 11/2008 |
| JP | 5622289 | 11/2014 |
| JP | 5622289 B2 | 11/2014 |
| JP | 2023-044277 | 3/2023 |
| JP | 2023-044277 A | 3/2023 |

\* cited by examiner

MAGNETIC DISK APPARATUS AND CONTROL METHOD

CROSS-REFERENCE TO RELATED APPLICATIONS

This application is based upon and claims the benefit of priority from Japanese Patent Application No. 2024-035580, filed on Mar. 8, 2024; the entire contents of which are incorporated herein by reference.

FIELD

Embodiments described herein relate generally to a magnetic disk apparatus and a control method.

BACKGROUND

A magnetic disk apparatus has a power loss protection (PLP) function. The PLP function is a function to, when supply of power from an external power supply is cut off, disable communication with a host device and save data, which is stored in a cache memory and is being written to a disk, to a nonvolatile storage area.

DETAILED DESCRIPTION

A magnetic disk apparatus according to an embodiment includes one or more magnetic disks, a motor, a power supply circuit, a first memory being non-volatile, a second memory being volatile and including a cache area, a controller, and a power supply monitoring circuit. The motor is configured to rotate the one or more magnetic disks. The power supply circuit is configured to generate second power from first power supplied by an external power supply, and generate third power when supply of the first power is cut off. The third power is generated based on regenerative energy generated by stoppage of the motor. The controller is configured to write data received from a host device to the magnetic disk via the cache area by using the second power generated by the power supply circuit while the first power is supplied. The controller is configured to execute a backup process when supply of the first power is cut off. The backup process is executed by disabling communication with the host device and saving content of the cache area to the first memory by using the third power generated by the power supply circuit. The power supply monitoring circuit is configured to monitor supply of the first power, and keep connection with the external power supply in a state where the supply of the first power is cut off. The controller is configured to enable communication with the host device in response to determining, by the power supply monitoring circuit, that the supply of the first power is restored.

Hereinafter, a disc device and a control method according to embodiments will be described in detail with reference to the accompanying drawings. The present invention is not limited by the following embodiment.

First Embodiment

Figure 1:
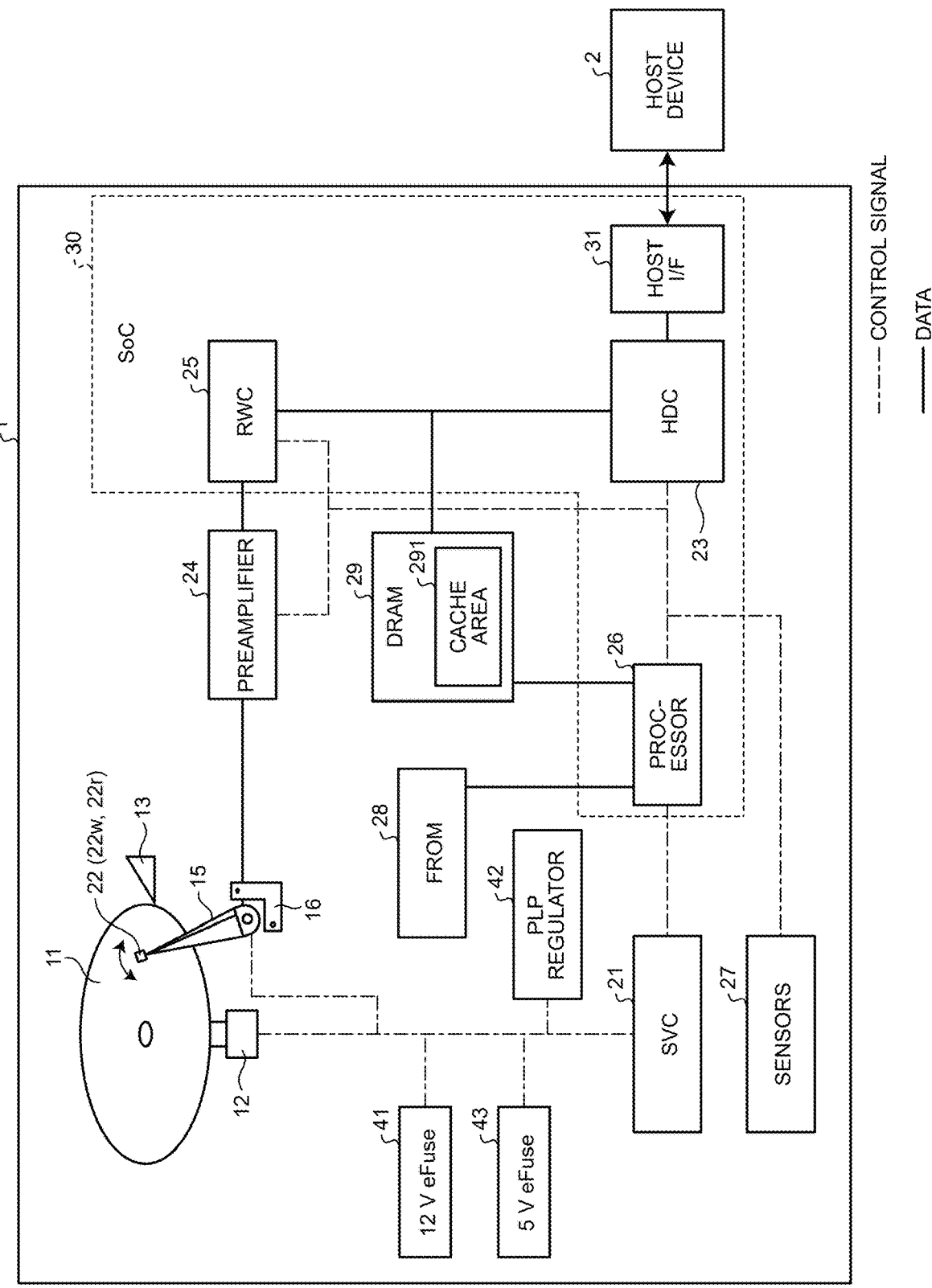
FIG. 1 is a schematic diagram illustrating an example of a configuration of a magnetic disk apparatus according to a first embodiment.

FIG. 1 is a schematic diagram illustrating an example of a configuration of a magnetic disk apparatus 1 according to the embodiment. The magnetic disk apparatus 1 is connected to a host device 2. The magnetic disk apparatus 1 can receive an access command such as a write command or a read command from the host device 2.

The magnetic disk apparatus 1 includes a magnetic disk 11 having a magnetic layer formed on a face thereof. The magnetic disk apparatus 1 accesses the magnetic disk 11 in response to the access command. The access includes writing of data and reading of data.

Data is written and read via a magnetic head 22. The magnetic disk apparatus 1 includes, in addition to the magnetic disk 11, a spindle motor (SPM) 12, a ramp 13, an actuator arm 15, a voice coil motor (VCM) 16, a servo controller (SVC) 21, a magnetic head 22, a hard disk controller (HDC) 23, a host interface (host I/F) 31, a preamplifier 24, a read/write channel (RWC) 25, a processor 26, sensors 27, a flash read only memory (FROM) 28, a dynamic random access memory (DRAM) 29, a 12V eFuse 41, a 5V eFuse 43, and a PLP regulator 42.

The magnetic disk 11 is rotated at a predetermined rotation speed by an SPM 12 attached coaxially.

The SVC 21 is an integrated circuit having a function as a driver that drives the SPM 12 and the VCM 16. Through the SVC 21, the processor 26 controls the rotation of the SPM 12 and the rotation of the VCM 16. Details of the SVC 21 will be described later.

The magnetic head 22 performs information writing and reading on the magnetic disk 11 by a write head 22w and a read head 22r provided in the magnetic head 22. The magnetic head 22 is fixed to a distal end of the actuator arm 15. The magnetic head 22 is moved in the radial direction of the magnetic disk 11 by the VCM 16 driven by the SVC 21. Note that one or both of the write head 22w and the read head 22r included in the magnetic head 22 may be provided in multiple numbers for a single magnetic head 22.

When, for example, the rotation of the magnetic disk 11 is stopped, the magnetic head 22 is moved onto the ramp 13. The ramp 13 is configured to hold the magnetic head 22 at a position spaced apart from the magnetic disk 11.

The preamplifier 24 is an integrated circuit that writes and reads data via the magnetic head 22. The preamplifier 24 amplifies and outputs a signal read from the magnetic disk 11 by the magnetic head 22 during the read operation, and supplies the signal to the RWC 25. In addition, the preamplifier 24 amplifies a signal corresponding to the data to be written supplied by the RWC 25 and supplies the amplified signal to the magnetic head 22 during the write operation.

The host I/F 31 is a communication interface with the host device 2. The HDC 23 controls transmission and reception of data with the host device 2 via the host I/F 31, and controls the DRAM 29.

The DRAM 29 is used as a buffer for data to be transmitted to and received from the host device 2. Thus, the cache area 291 is allocated to the DRAM 29, and the DRAM 29 functions as a cache memory. The cache area 291 is used for temporarily storing data to be written that is not yet written to the magnetic disk 11 out of data received from the host device 2. The DRAM 29 is also used for temporarily storing data read from the magnetic disk 11.

The DRAM 29 is used as an operation memory by the processor 26. The DRAM 29 is used as an area where firmware is loaded and an area where various types of management data are temporarily stored. The DRAM 29 is an example of the second memory being a volatile memory.

The RWC 25 performs code modulation on data to be written, which is supplied by the HDC 23 and stored in the cache area 291, and supplies the code-modulated data to the preamplifier 24. The RWC 25 also performs code demodulation including error correction on a signal that is read from the magnetic disk 11 and supplied by the preamplifier 24, and outputs the code-demodulated signal to the HDC 23 as digital data.

In one example, the processor 26 is a central processing unit (CPU). The sensors 27, the flash read only memory (FROM) 28, and the DRAM 29 are connected to the processor 26.

The FROM 28 stores firmware (program data), various operation parameters, and the like. The firmware may be stored in the magnetic disk 11. The FROM 28 is an example of the first memory being a non-volatile memory.

The sensors 27 are sensor modules that detect environment information. The sensors 27 include, for example, an acceleration sensor module for detecting vibration or impact applied to the magnetic disk apparatus 1, a temperature sensor module for detecting the temperature of the magnetic disk apparatus 1, etc.

The processor 26 performs overall control of the magnetic disk apparatus 1 according to a firmware stored in the FROM 28 or the magnetic disk 11. For example, the processor 26 loads a firmware from the FROM 28 or the magnetic disk 11 into the DRAM 29, and controls, according to the firmware loaded into the DRAM 29, the SVC 21, the preamplifier 24, the RWC 25, the HDC 23, and the like.

The HDC 23, the host I/F 31, the RWC 25, and the processor 26 are configured as a system-on-a-chip (SoC) 30 that is one integrated circuit. In addition to these element, the SoC 30 may include other elements (for example, the FROM 28, the DRAM 29, or the like).

Some of or all the functions of the processor 26 may be implemented by a hardware circuit such as a field-programmable gate array (FPGA) or an application specific integrated circuit (ASIC).

Figure 2:
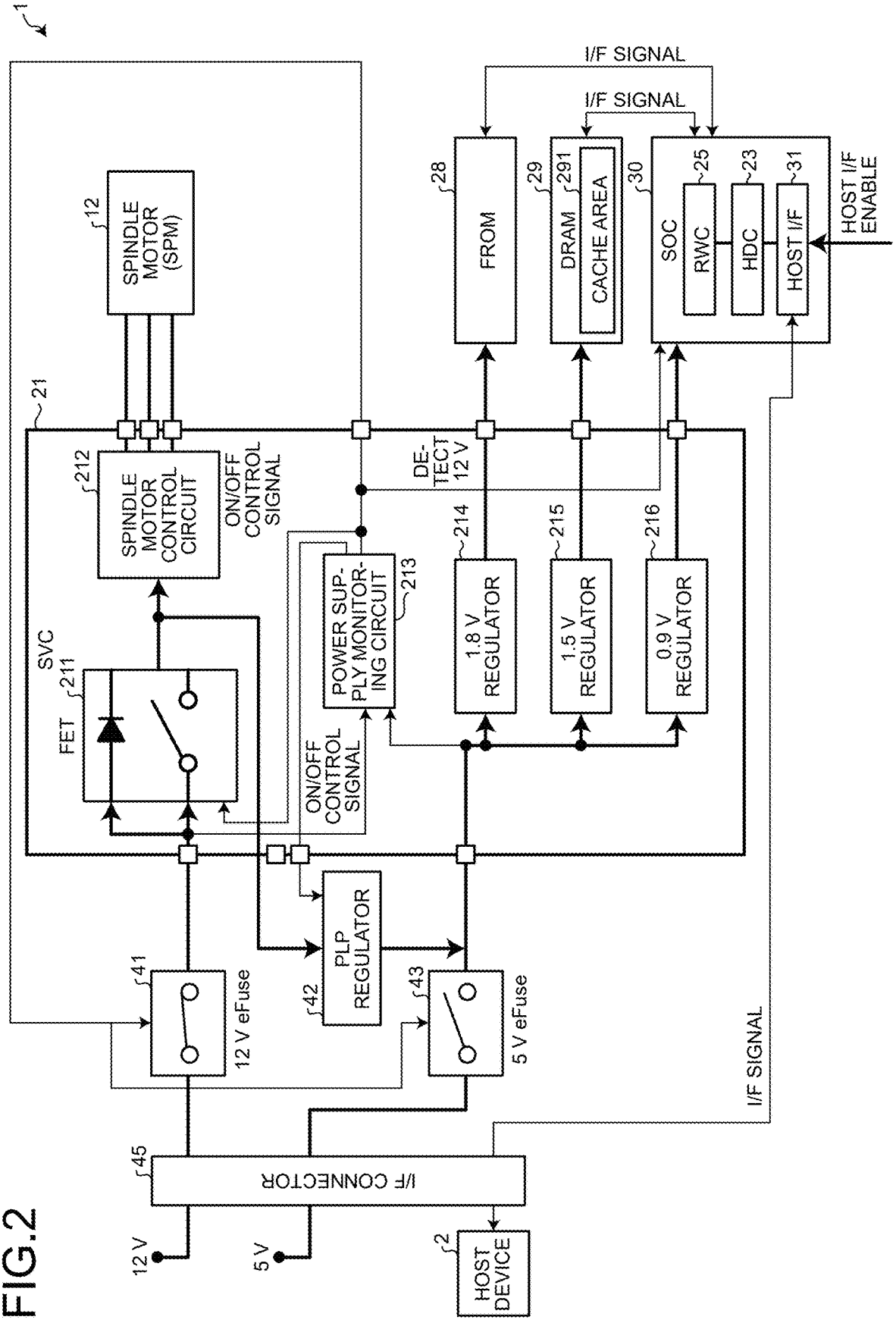
FIG. 2 is a diagram illustrating an example of a configuration of a magnetic disk apparatus illustrating a configuration of an SVC according to the first embodiment.

FIG. 2 is a diagram illustrating an example of a configuration of the magnetic disk apparatus 1 illustrating a configuration of the SVC 21 according to the first embodiment.

An I/F connector 45 is a general term for various terminals, and is provided in a housing of the magnetic disk apparatus 1. The host device 2 is provided with a 12V power supply and a 5V power supply as external power supplies. The 12V power supply is an example of a first external power supply, and the 5V power supply is an example of a second external power supply.

The 12V eFuse 41 (an example of a first electronic fuse) is connected to the 12V power supply via the I/F connector 45. The I/F connector 45 to which the 12V eFuse 41 is connected is a terminal for 12V power supply. The 12V eFuse 41 is also connected to the SVC 21. Power supplied by the 12V power supply is input to the 12V eFuse 41 via the I/F connector 45 (namely, the terminal for 12V power supply).

The 12V eFuse 41 is an integrated circuit that include a MOSFET and has an overcurrent protection function to prevent an overcurrent from flowing through a power supply lane on which the 12V eFuse 41 is provided. The overcurrent protection function enables the 12V eFuse 41 to perform detection of overcurrent and perform cutoff of power when overcurrent is detected. When the 12V power supply is cut off, the 12V eFuse 41 is turned off. By being turned on, the 12V eFuse 41 supplies the SVC 21 with power that is supplied by the 12V power supply when the 12V power supply is restored.

The 5V eFuse 43 (an example of a second electronic fuse) is connected to a 5V power supply via the I/F connector 45. The I/F connector 45 to which the 5V eFuse 43 is connected is a terminal for 5V power supply. The 5V eFuse 43 is also connected to the SVC 21. Power supplied by the 5V power supply is input to the 5V eFuse 43 via the I/F connector 45 (namely, the terminal for 5V power supply).

The 5V eFuse 43 is an integrated circuit that includes a MOSFET and has an overcurrent protection function to prevent an overcurrent from flowing through a power supply lane on which the 5V eFuse 43 is provided. The overcurrent protection function enables the 5V eFuse 41 to perform detection of overcurrent and perform cutoff of power when overcurrent is detected. When the 5V power supply is cut off, the 5V eFuse 43 is turned off. By being turned on, the 5V eFuse 43 supplies the SVC 21 with power that is supplied by the 5V power supply when the 5V power supply is restored.

The PLP regulator 42 supplies power to the SVC 21 for a PLP function to be described later. When the supply of power from the 12V power supply is cut off, the PLP regulator 42 supplies a back electromotive force of the SPM 12, which is supplied by a spindle motor control circuit 212 to be described later. If the supply of power from the 12V power supply is not cut off, power (an example of the second power) is generated based on power supplied by the 12V power supply via the FET 211, and the generated power is supplied to the SVC 21. Here, generation of power includes, for example, processing such as rectification, boosting voltage, or reducing voltage. The PLP regulator 42 may directly supply the supplied power to each unit.

When the supply of power from the external power supply (12V power supply and/or 5V power supply) provided in the host device 2 is cut off, a power supply monitoring circuit 213 to be described later can detect that the supply of power from the host device 2 is cut off. In a case where the power supply monitoring circuit 213 detects that the supply of power from the host device 2 is cut off, the PLP regulator 42 receives regenerative energy generated by the SPM 12 via the spindle motor control circuit 212. Then, the PLP regulator 42 generates power based on the regenerative energy from the SPM 12 and supplies the generated power to the SVC 21. In other words, the PLP regulator 42 generates power based on the back electromotive force from the SPM 12 and supplies the generated power to the SVC 21.

The power supplied by the 12V power supply is an example of the first power and the fourth power. The power supplied by the 5V power supply is an example of the first power and the fifth power. The power generated based on the back electromotive force from the SPM 12 is an example of the third power.

When the current supplied to the SPM 12 is stopped during the rotation of the magnetic disk 11, the energy caused by the back electromotive force of the SPM 12 is recovered as regenerative energy by the spindle motor control circuit 212. In addition, kinetic energy of the rotating magnetic disk is converted into electric energy by the SPM 12. The electric energy is recovered as regenerative energy by the spindle motor control circuit 212.

As described above, the PLP regulator 42 generates power to be supplied to each unit, based on regenerative energy that is generated by stoppage of the SPM 12. Therefore, the magnetic disk apparatus 1 can operate by using the regenerative energy for a while after the supply of power from the host device 2 is cut off. In this period of time, the PLP function processing is performed by the magnetic disk apparatus 1.

The PLP function is a function to save, to the nonvolatile memory, data stored in the cache memory of the DRAM 29 in order to prevent the data from being lost from the magnetic disk apparatus 1 when the cut-off of the supply of power from the host device 2 is detected while the data is written to the magnetic disk 11. In the case of the present embodiment, data in the cache area 291 is saved to the FROM 28, as a process of the PLP function.

Here, the wording of "saving data" refers to processing of recording the data temporarily in another recording area. As long as the data is recorded temporarily in another recording area, the "saving data" can be interpreted as transferring the data, copying the data, or the like. The saving may include a process of processing data, such as compression, encoding, format conversion, and the like. Hereinafter, a process of saving data in the cache area 291 to the FROM 28 may be referred to as a backup process.

As illustrated in FIG. 2, the SVC 21 mainly includes an FET 211, a spindle motor control circuit 212, a power supply monitoring circuit 213, a 1.8V regulator 214, a 1.5V regulator 215, and a 0.9V regulator 216.

The FET 211 is a field effect transistor and is connected between the spindle motor control circuit 212 and the 12V eFuse 41. When turned on in accordance with an on/off control signal from the power supply monitoring circuit 213, the FET 211 supplies the spindle motor control circuit 212 with power that is supplied by the 12V power supply. When turned off in accordance with an on/off control signal from the power supply monitoring circuit 213, power supplied by the 12V power supply is cut off. The spindle motor control circuit 212 controls the rotation of the SPM 12.

The power supply monitoring circuit 213 monitors supply of power from the host device 2 by monitoring power supplied from the 12V power supply and power supplied from the 5V power supply. The power supply monitoring circuit 213 is connected to the 12V eFuse 41. The power supply monitoring circuit 213 monitors the power supply voltage of the 12V power supply, and monitors whether the 12V power supply is in the power interruption state or is restored from the power interruption state. The power supply monitoring circuit 213 is also connected to the 5V eFuse 43. The power supply monitoring circuit 213 monitors a power supply voltage of the 5V power supply, and monitors whether the 5V power supply is in a power interruption state or is restored from the power interruption state.

In response to detecting that the supply of power from the host device 2 is cut off, the power supply monitoring circuit 213 turns off the FET 211 by negating the on/off control signal output to the FET 211. In addition, the power supply monitoring circuit 213 asserts an on/off control signal for the PLP regulator 42 in response to detecting that the supply of power from the host device 2 is cut off. As a result, the PLP function can be backed up. Hereinafter, cut-off of supply of power from the host device 2 may be referred to as power loss.

The 1.8V regulator 214 generates power of 1.8 V based on the power from the 12V eFuse 41, the 5V eFuse 43, and the PLP regulator 42, and supplies the generated power to the FROM 28.

The 1.5V regulator 215 generates power of 1.5 V based on the power from the 12V eFuse 41, the 5V eFuse 43, and the PLP regulator 42, and supplies the generated power to the DRAM 29.

The 0.9V regulator 216 generates power of 0.9 V based on the power from the 12V eFuse 41, the 5V eFuse 43, and the PLP regulator 42, and supplies the generated power to the SoC 30.

The PLP regulator 42, the 1.8V regulator 214, the 1.5V regulator 215, and the 0.9V regulator 216 are each an example of a power supply circuit.

The HDC 23 is an example of a controller. The HDC 23 may include a central processing unit (CPU), a logic circuit, or both. The HDC 23 controls the entire magnetic disk apparatus 1 according to a command received from the host device 2.

The HDC 23 executes a normal operation using the power supplied by the 0.9V regulator 216 while receiving supply of power from the host device 2. The normal operation includes transmission and reception of commands and data via the host I/F 31 to and from the host device 2, and access to (write to and read from) the magnetic disk 11.

In the normal operation, when data requested to be written by the write command is received from the host device 2, the HDC 23 stores the received data in the cache area 291. The HDC 23 causes the RWC 25 to write the data in the cache area 291 to the magnetic disk 11. In other words, the HDC 23 writes the data received from the host device 2 to the magnetic disk 11 via the cache area 291. The HDC 23 transmits data output from the RWC 25 to the host device 2.

When the external power supply is in a power interruption state and the power supply is cut off (namely, when power loss occurs), the HDC 23 terminates the normal operation and disables the communication with the host device 2 by negating the host I/F enable signal.

The host I/F enable signal is a signal for instructing the host I/F 31 to enable/disable communication. By asserting the host I/F enable signal, the host I/F 31 is enabled, and communication with the host device 2 is enabled. On the other hand, by negating the host I/F enable signal, the host I/F 31 is invalid, and communication with the host device 2 is invalid. Here, the host I/F enable signal is a signal for controlling communication with the host device 2. By assertion of the host I/F enable signal, communication with the host device 2 is enabled, and communication with the host device 2 is disabled by negation.

Then, the HDC 23 executes a backup process related to the PLP function. The power supply monitoring circuit 213 makes a notification of the cut-off of the power supply (namely, the occurrence of the power loss) due to the cut-off of the external power supply. The HDC 23 can execute the backup process in a period during which the backup enable signal is asserted after receiving the notification of the cut-off of the power supply. The HDC 23 executes the backup process by using the power supplied by the PLP regulator 42, namely, using the power generated from the regenerative energy that is generated by stoppage of the SPM 12.

In the present embodiment, the HDC 23 keeps connection between the external power supply and the magnetic disk apparatus 1 even when the power supply is cut off. Then, the HDC 23 enables communication with the host device 2 when the power supply monitoring circuit 213 determines that the power supply is restored.

More specifically, even when the power supply monitoring circuit 213 detects that either one or both of the supply of power from the 12V power supply and the supply of power from the 5V power supply are cut off, the HDC 23 keeps connection with the 12V power supply and connection with the 5V power supply, and starts the backup process. In a state where supply of power from the 12V power supply alone is cut off, or in a state where supply of power from the 5V power supply alone is cut off, or in a state where supply of power from both the 12V power supply and the 5V power supply is cut off, the HDC 23 turns on the 12V eFuse 41 and the 5V eFuse 43, and starts the backup process. Therefore, the power supply monitoring circuit 213 can detect restoration of the 12V power supply and restoration of the 5V power supply.

In the example of FIG. 2 depicting the 12V eFuse 41 being turned on, the 12V power supply is restored. Alternatively, the 5V power supply may be restored in some cases.

Figure 3:
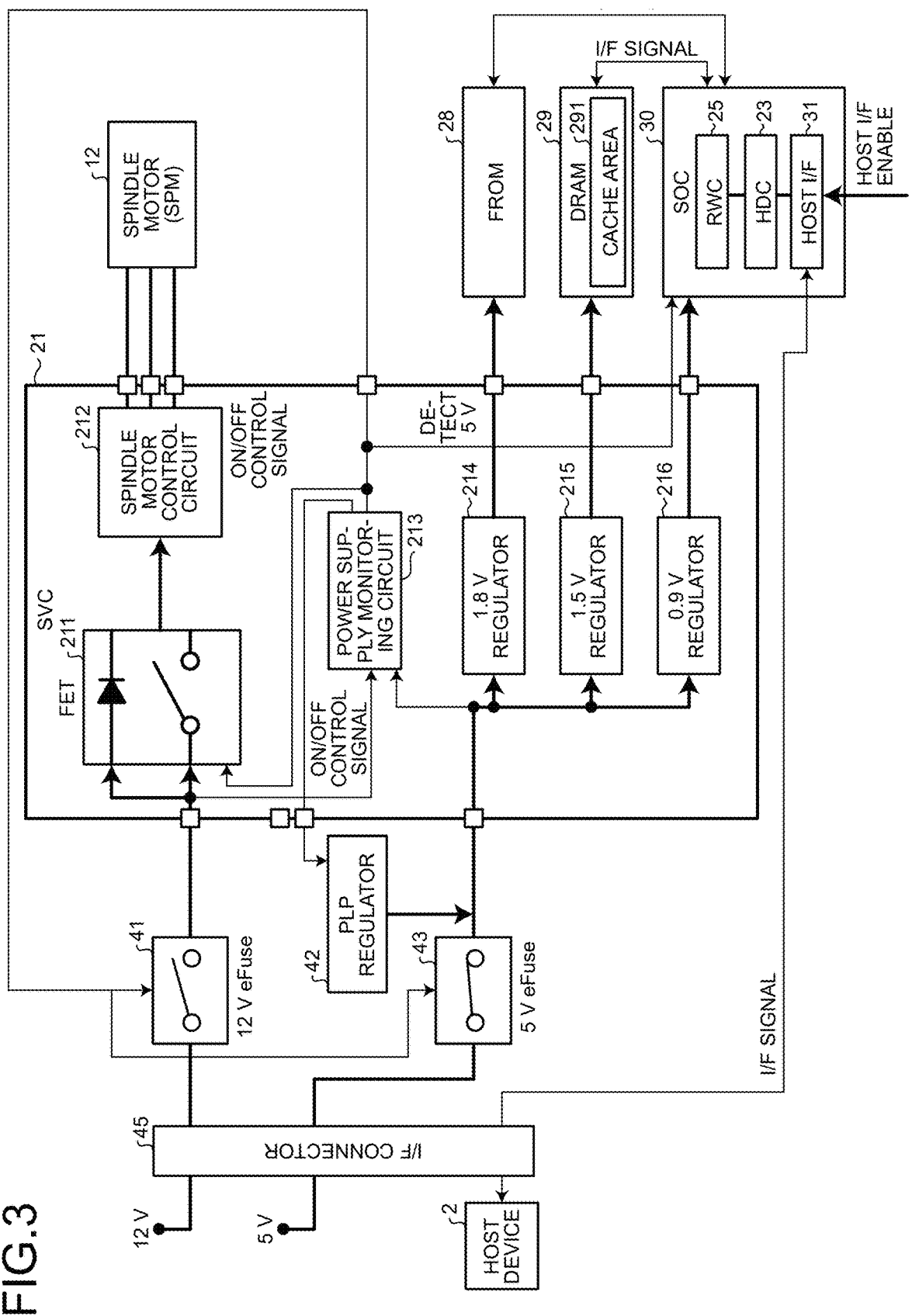
FIG. 3 is a diagram illustrating an example of a case where only a 5V power supply is restored in the configuration of the magnetic disk apparatus according to the first embodiment.

FIG. 3 is a diagram illustrating an example of a case where only a 5V power supply is restored in the configuration of the magnetic disk apparatus 1 according to the first embodiment. In the example of FIG. 3 depicting the 5V eFuse 43 being turned on, the 5V power supply is restored. Alternatively, both the 12V power supply and the 5V power supply may be restored in some cases.

As described above, in the present embodiment, the connection with the 12V power supply and the connection with the 5V power supply are kept by the turned-on 12V eFuse 41 and the turned-on 5V eFuse 43, respectively, during the backup process. Therefore, when the supply of power from the 12V power supply or the supply of power from the 5V power supply is restored, the power supply monitoring circuit 213 can detect their restoration. When the power supply monitoring circuit 213 detects that the supply of power from the 12V power supply and/or the supply of power from the 5V power supply, which were/was cut off but are/is thereafter restored, the HDC 23 asserts the host I/F enable signal to enable the communication with the host device 2.

The communication with the host device 2 is enabled during the backup process, so that there is a case where write data is transmitted from the host device 2. In such a case, the HDC 23 receives the write data transmitted from the host device 2 during the backup process, and stores the received write data in the FROM 28.

Figure 4:
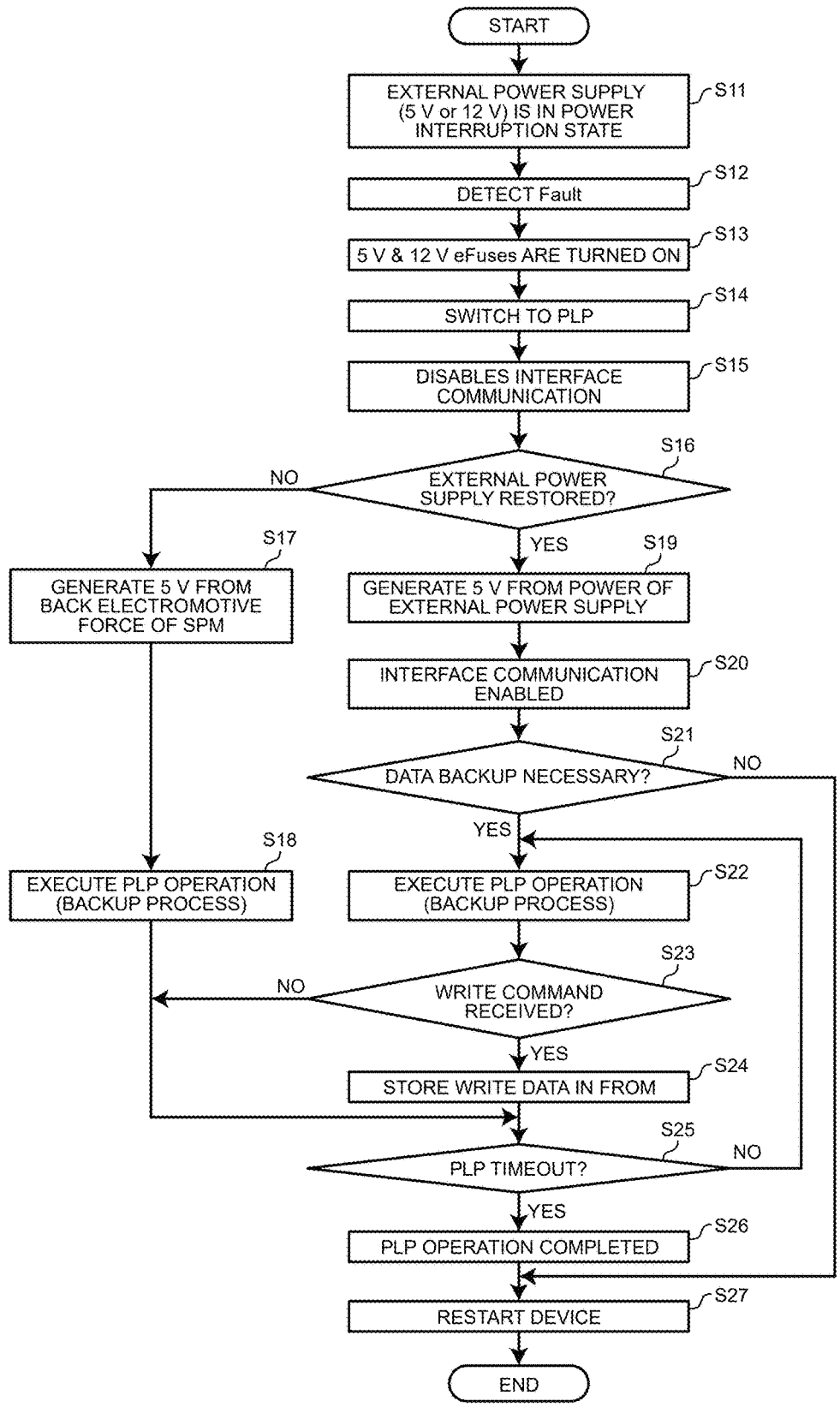
FIG. 4 is a flowchart illustrating an example of a procedure of a control process according to the first embodiment.

Next, the control process by the magnetic disk apparatus 1 according to the present embodiment configured as described above will be described. FIG. 4 is a flowchart illustrating an example of a procedure of a control process according to the first embodiment. It is assumed that the external power supply (namely, the 5V power supply or the 12V power supply) is in a power interruption state while the magnetic disk apparatus 1 is executing the normal process (S11). In this case, the power supply monitoring circuit 213 detects Fault and determines that the supply of power from the 5V power supply or the 12V power supply is cut off (S12). Then, the power supply monitoring circuit 213 turns on the 12V eFuse 41 and the 5V eFuse 43 (S13).

Next, the power supply monitoring circuit 213 asserts an on/off control signal for the PLP regulator 42, whereby the processing is switched to the execution of the PLP function (S14). Thereafter, the HDC 23 disables communication with the host device 2 (S15). Subsequently, the power supply monitoring circuit 213 determines whether the power supply is restored by restoration of the external power supply (12V power supply or 5V power supply) (S16). In response to determining that the external power supply is not restored (S16: No), the PLP regulator 42 generates power of 5 V from the back electromotive force of the SPM 12 and supplies the generated power of 5 V to the SVC 21 (S17). The HDC 23 executes the operation of the PLP function and executes the backup process (S18). Thereafter, the process proceeds to S25.

On the other hand, in response to determining that the external power supply (12V power supply or 5V power supply) is restored and the supply of power from the external power supply is also restored (S16: Yes), the PLP regulator 42 generates power of 5 V from the power of the restored external power supply (12V power supply or 5V power supply) and supplies the generated power of 5 V to the SVC 21 (S19).

Next, the HDC 23 enables communication with the host device 2 (S20). The HDC 23 determines whether data backup is necessary (S21). Specifically, the HDC 23 determines whether the operation mode of the magnetic disk apparatus 1 is a standby state, an idle B state, or an idle C state.

The idle B state refers to a state where the SPM 12 normally rotates (for example, 7200 rpm) while the magnetic head 22 is retracted. The idle C state is a state where the SPM 12 rotates at a low speed (for example, 3200 rpm) in a state where the magnetic head 22 is retracted.

When the operation mode of the magnetic disk apparatus 1 is any of the standby state, the idle B state, and the idle C state, backup of data is not necessary (S21: No). In this case, the process proceeds to S27, the HDC 23 restarts the magnetic disk apparatus 1 (S27), and the process ends.

If the operation mode of the magnetic disk apparatus 1 is not the standby state, the idle B state, or the idle C state, backup of data is necessary (S21: Yes). In this case, the HDC 23 executes the operation of the PLP function and executes the backup process (S22).

Next, the HDC 23 determines whether a write command has been received from the host device 2 (S23). In response to determining that the write command has been received from the host device 2 (S22: Yes), the write data is stored in the FROM 28 (S24). In response to determining that the write command is not yet received from the host device 2 (S23: No), the processing of S24 is not performed.

Next, the HDC 23 determines whether the PLP operation has timed out (S25). In response to determining that the PLP operation has not timed out (S25: No), the process returns to S22, and the process from S22 to S24 is repeatedly executed.

On the other hand, in response to determining that the PLP operation has timed out (S25: Yes), the HDC 23 completes the PLP operation (S26). Then, the HDC 23 restarts the magnetic disk apparatus 1 (S27), and the process ends.

As a side note, in a case of a magnetic disk apparatus of a comparative example, when the supply of power from an external power supply is interrupted during the operation, a backup process of writing data of DRAM to FROM is performed by using the back electromotive force of SPM by the PLP function. At this time, in order to maintain the back electromotive force, unnecessary circuits and unnecessary communication interfaces are disabled. However, in such a case, the magnetic disk apparatus of the comparative example cannot be restarted and communication with a host device cannot be performed until the PLP function times out.

Therefore, if duration of a timer of the host device is short, the host device cannot recognize the magnetic disk apparatus due to timeout.

Considering the above issue, in the magnetic disk apparatus 1 according to the present embodiment, the power supply monitoring circuit 213 keeps the connection with the external power supply (12V power supply and 5V power supply) even when the supply of power from the external power supply is cut off. Then, when the power supply monitoring circuit 213 determines that the supply of power from the external power supply is restored, the HDC 23 enables the communication with the host device 2.

Therefore, according to the present embodiment, even when the PLP function is executed due to cutoff of supply of power from the external power supply and the backup process is being executed, the restoration of the external power supply can be monitored, and the communication with the host device 2 can be enabled immediately when the restoration of the external power supply is detected. Therefore, according to the present embodiment, it is possible to avoid the occurrence of timeout by the host device 2 due to the disconnection between the host device 2 and the magnetic disk apparatus 1, and possible to smoothly communicate with the host device 2 after restoration of the external power supply.

In addition, in the magnetic disk apparatus 1 according to the present embodiment, the power supply monitoring circuit 213 monitors the supply of power from the 12V power supply and the supply of power from the 5V power supply, and keeps connection between the 12V power supply and the magnetic disk apparatus 1 and also keeps connection between the 5V power supply and the magnetic disk apparatus 1 even when either one or both of the supply of power from the 12V power supply and the supply of power from the 5V power supply are cut off. Thereafter, the HDC 23 enables communication with the host device 2 when the power supply monitoring circuit 213 determines that either the supply of power from the 12V power supply or the supply of power from the 5V power supply is restored.

Therefore, according to the present embodiment, even when the PLP function is executed due to cutoff of the supply of power from the 12V power supply or the supply of power from the 5V power supply and the backup process is being executed, the restoration of the supply of power from the 12V power supply and the supply of power from the 5V power supply can be monitored, and the communication with the host device 2 can be enabled immediately when the restoration of the external power supply is detected. Therefore, according to the present embodiment, it is possible to avoid the occurrence of timeout by the host device 2 due to the disconnection between the host device 2 and the magnetic disk apparatus 1, and possible to smoothly communicate with the host device 2 after restoration of the external power supply.

Moreover, in the magnetic disk apparatus 1 according to the present embodiment, the power supply monitoring circuit 213 turns on the 12V eFuse 41 connected between the 12V power supply and the power supply monitoring circuit 213 and the 5V eFuse 43 connected between the 5V power supply and the power supply monitoring circuit 213 even when either one or both of the supply of power from the 12V power supply and the supply of power from the 5V power supply are cut off.

Therefore, according to the present embodiment, even when the PLP function is executed due to cutoff of the supply of power from the 12V power supply or the supply of power from the 5V power supply and the backup process is being executed, it is possible to reliably monitor the restoration of the supply of power from the 12V power supply and the supply of power from the 5V power supply. Therefore, according to the present embodiment, after the 12V power supply or the 5V power supply that was cut off is restored, it is possible to more smoothly communicate with the host device 2 by avoiding the occurrence of timeout by the host device 2 due to the disconnection between the host device 2 and the magnetic disk apparatus 1.

In the magnetic disk apparatus 1 according to the present embodiment, when the communication with the host device 2 is enabled during the backup process of the PLP function, the HDC 23 receives the write data transmitted from the host device 2 and stores the received write data in the FROM 28.

Therefore, according to the present embodiment, when the 12V power supply or the 5V power supply that was cut off is restored, a write command can be transmitted from the host device 2 to the magnetic disk apparatus 1 while avoiding the occurrence of timeout by the host device 2. Thus, communication with the host device 2 can be more smoothly performed.

Second Embodiment

In the above-described first embodiment, even when the external power supply is interrupted, the magnetic disk apparatus 1 keeps the connection with the external power supply. Thereafter, when the external power supply is restored, the magnetic disk apparatus 1 enables the communication with the host device 2, and writes data to the FROM 28 when the write command is received from the host device 2 during the PLP operation. In the second embodiment that will be described, information about the state of the magnetic disk apparatus 1, such as the progress of the PLP operation, is transmitted to the host device 2.

The configuration of the magnetic disk apparatus 1 according to the present embodiment is similar to that of the first embodiment illustrated in FIGS. 1 to 3.

In addition to having a function similar to that of the first embodiment, the HDC 23 according to the present embodiment transmits information about the state of the magnetic disk apparatus 1 to the host device 2 when the communication with the host device 2 is enabled during execution of the backup process by the PLP function.

The information about the state of the magnetic disk apparatus 1 includes at least the progress status of the backup process by the PLP function and/or the operation mode of the magnetic disk apparatus 1.

Moreover, upon receiving an instruction to suspend the backup process from the host device 2 after transmitting the information about the state of the magnetic disk apparatus 1 to the host device 2, the HDC 23 according to the present embodiment terminates the backup process of the PLP function before a timeout of the backup process of the PLP function.

Figure 5:
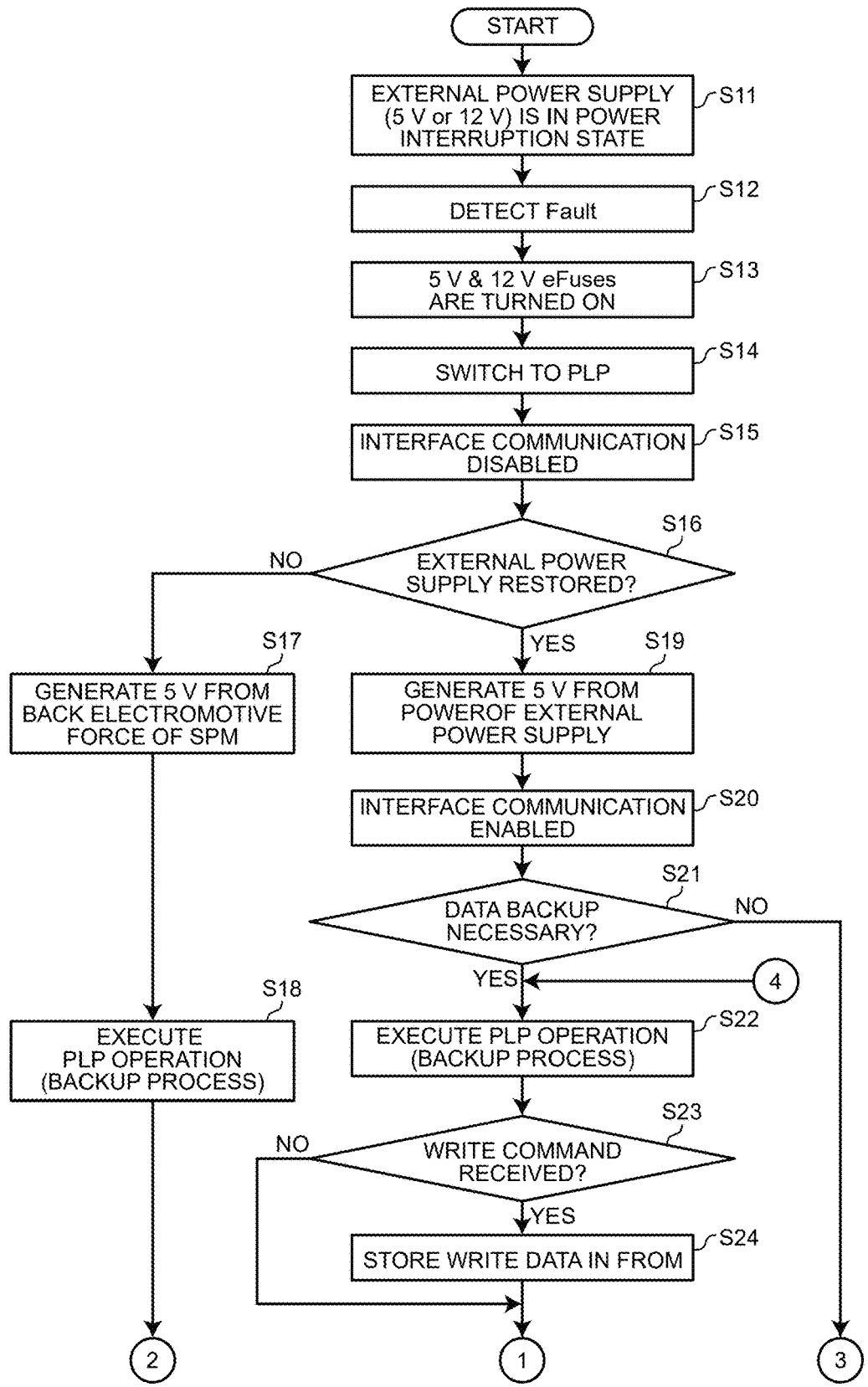
FIG. 5 is a flowchart illustrating an example of a procedure of a control process according to a second embodiment.
Figure 6:
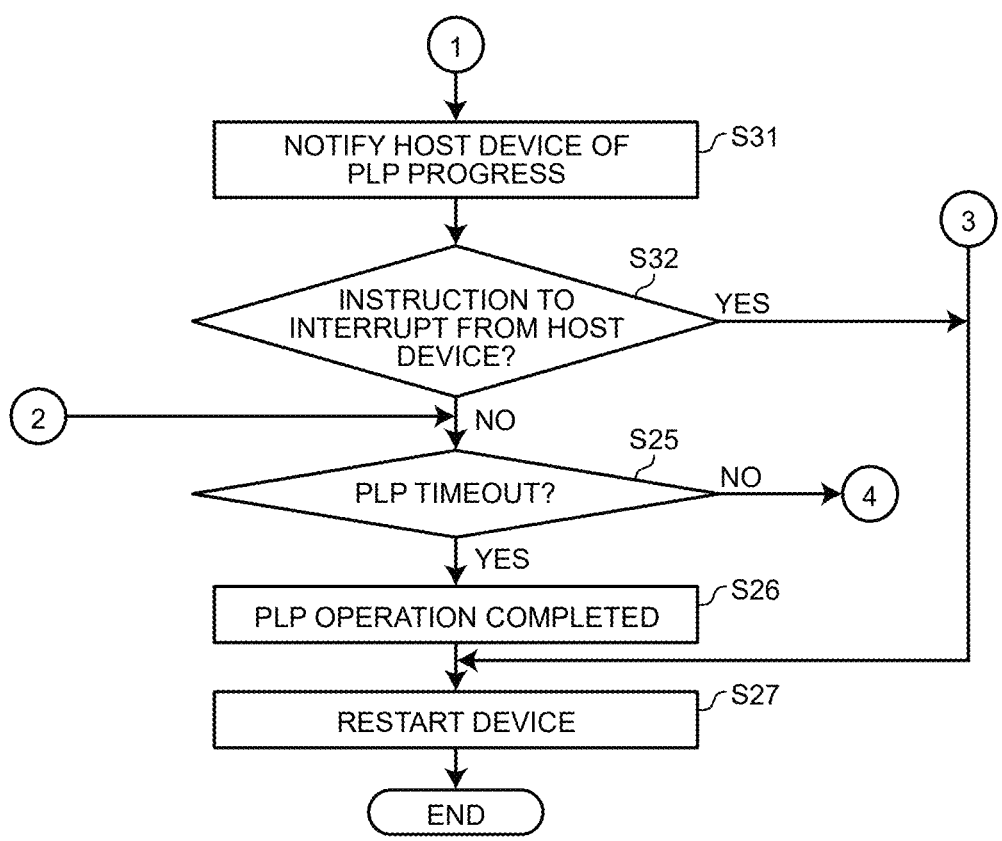
FIG. 6 is a flowchart illustrating an example of a procedure (continuation) of the control process according to the second embodiment.

Next, the control process by the magnetic disk apparatus 1 according to the present embodiment configured as described above will be described. FIGS. 5 and 6 are flowcharts illustrating an example of a procedure of a control process according to the second embodiment.

Processing (S11 to S24) from the occurrence of the 5V power supply interruption or the 12V power supply interruption to the reception of the write command and the storage of the write data is executed as in the first embodiment.

After S24, the HDC 23 transmits the progress status of the PLP operation to the host device 2 as information about the state of the magnetic disk apparatus 1 (S31). The HDC 23 may transmit the operation mode of the magnetic disk apparatus 1 to the host device 2.

Next, the HDC 23 determines whether an instruction to interrupt the PLP operation (namely, the backup process) has been received from the host device 2 (S32). In response to determining that the instruction to interrupt the PLP operation (backup process) is not yet received from the host device 2 (S32: No), the process proceeds to S25, and the process similar to that of the first embodiment is performed.

On the other hand, in response to determining that the instruction to interrupt the PLP operation is received from the host device 2 (S32: Yes), the HDC 23 interrupts the PLP operation without waiting for a timeout of the PLP operation. Then, the HDC 23 restarts the magnetic disk apparatus 1 (S27), and the process ends.

As described above, in the magnetic disk apparatus 1 according to the present embodiment, when the communication with the host device 2 is enabled during the backup process of the PLP function, the HDC 23 transmits the information about the state of the magnetic disk apparatus 1 to the host device 2.

Therefore, even when the PLP function is executed due to cutoff of the supply of power from the external power supply and the backup process is being executed, information about the state of the magnetic disk apparatus 1 is transmitted to the host device 2 when the cut off external power supply is restored. Thus, it is possible to avoid occurrence of timeout by the host device 2 due to disconnection between the host device 2 and the magnetic disk apparatus 1, and possible to more smoothly communicate with the host device 2.

Moreover, in the magnetic disk apparatus 1 according to the present embodiment, the information about the state of the magnetic disk apparatus 1 includes at least the progress status of the backup process of the PLP function and/or the operation mode of the magnetic disk apparatus 1.

Therefore, according to the present embodiment, even when the PLP function is executed due to cutoff of the supply of power from the external power supply and the backup process is being executed, at least the progress status of the backup process of the PLP function and/or the operation mode of the magnetic disk apparatus 1 is transmitted to the host device 2 when the cut off external power supply is restored. Therefore, it is possible to avoid occurrence of timeout by the host device 2 due to disconnection between the host device 2 and the magnetic disk apparatus 1, and possible to more smoothly communicate with the host device 2.

In addition, in the magnetic disk apparatus 1 according to the present embodiment, when an instruction to interrupt the backup process is received from the host device 2 after transmitting the information about the state of the magnetic disk apparatus 1 to the host device 2, the HDC 23 terminates the backup process as the PLP operation without waiting for the timeout of the backup process.

Therefore, according to the present embodiment, in a case where the PLP function is executed due to cutoff of the supply of power from the external power supply and the cut off external power supply is thereafter restored during the backup process being executed, the backup process is terminated without waiting for a timeout of the backup process when an instruction to interrupt the backup process is received from the host device 2. Therefore, the communication with the host device 2 can be performed more smoothly.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk apparatus comprising:
   one or more magnetic disks;
   a motor configured to rotate the one or more magnetic disks;
   a power supply circuit configured to
      generate second power from first power supplied by an external power supply, and
      generate third power when supply of the first power is cut off, the third power being generated based on regenerative energy generated by stoppage of the motor;
   a first memory being non-volatile;
   a second memory being volatile and including a cache area;
   a controller configured to
      write data received from a host device to the one or more magnetic disks via the cache area by using the second power generated by the power supply circuit while the first power is supplied, and
      execute a backup process when supply of the first power is cut off, the backup process being executed by disabling communication with the host device and saving content of the cache area to the first memory by using the third power generated by the power supply circuit; and
   a power supply monitoring circuit configured to
      monitor supply of the first power, and
      keep connection with the external power supply in a state where the supply of the first power is cut off,
   wherein the controller is configured to enable communication with the host device in response to determining, by the power supply monitoring circuit, that the supply of the first power is restored.

2. The magnetic disk apparatus according to claim 1, wherein
   the external power supply includes
      a first external power supply configured to supply fourth power as the first power, and
      a second external power supply configured to supply fifth power as the first power, the power supply monitoring circuit is configured to
   monitor supply of the fourth power and supply of the fifth power, and
   keep connection with the first external power supply and connection with the second external power supply in a state where either one or both of the supply of the fourth power and the supply of the fifth power are cut off; and
   the controller is configured to enable communication with the host device in response to determining, by the power supply monitoring circuit, that either the cut off supply of the fourth power or the cut off supply of the fifth power is restored.

3. The magnetic disk apparatus according to claim 2, further comprising:
   a first electronic fuse connected between the first external power supply and the power supply circuit, and between the first external power supply and the power supply monitoring circuit, the first electronic fuse being configured to
- enable, by being turned on, supply of the fourth power from the first external power supply to the power supply circuit, and
- cut off the supply of the fourth power by being turned off; and a second electronic fuse connected between the second external power supply and the power supply circuit, and between the second external power supply and the power supply monitoring circuit, the second electronic fuse being configured to
- enable, by being turned on, supply of the fifth power from the second external power supply to the power supply circuit, and
- cut off the supply of the fifth power by being turned off, wherein the power supply monitoring circuit is configured to turn on the first electronic fuse and the second electronic fuse in a state where either one or both of the supply of the fourth power and the supply of the fifth power are cut off.

4. The magnetic disk apparatus according to claim 1, wherein the controller is configured to receive write data transmitted from the host device and store the received write data in a first memory when communication with the host device is enabled during execution of the backup process.

5. The magnetic disk apparatus according to claim 1, wherein the controller is configured to transmit information about a state of the magnetic disk apparatus to the host device when communication with the host device is enabled during execution of the backup process.

6. The magnetic disk apparatus according to claim 5, wherein the information about the state of the magnetic disk apparatus includes a progress status of the backup process and/or an operation mode of the magnetic disk apparatus.

7. The magnetic disk apparatus according to claim 5, wherein the controller is configured to terminate the backup process without waiting for a timeout of the backup process in response to receiving an instruction to interrupt the backup process from the host device after transmitting the information about the state of the magnetic disk apparatus to the host device.

8. A control method implemented by a magnetic disk apparatus, the magnetic disk apparatus including one or more magnetic disks, a motor serving to rotate the one or more magnetic disks, a power supply circuit serving to generate second power from first power supplied by an external power supply and generate third power when supply of the first power is cut off, the third power being generated based on regenerative energy generated by stoppage of the motor, a first memory being non-volatile, and a second memory being volatile and including a cache area, the control method comprising:
- writing data received from a host device to the one or more magnetic disks via the cache area by using the second power generated by the power supply circuit while the first power is supplied;
- executing a backup process when supply of the first power is cut off, the backup process being executed by disabling communication with the host device and saving content of the cache area to the first memory by using the third power generated by the power supply circuit;
- monitoring supply of the first power;
- keeping connection with the external power supply in a state where the supply of the first power is cut off; and
- enabling communication with the host device in response to determining, by the monitoring, that the supply of the first power is restored.

9. The control method according to claim 8, wherein the external power supply includes a first external power supply serving to supply fourth power as the first power and includes a second external power supply serving to supply fifth power as the first power, the control method further comprising:
- monitoring supply of the fourth power and supply of the fifth power;
- keeping connection with the first external power supply and connection with the second external power supply in a state where either one or both of the supply of the fourth power and the supply of the fifth power are cut off; and
- enabling communication with the host device in response to determining, by the monitoring, that either the cut off supply of the fourth power or the cut off supply of the fifth power is restored.

10. The control method according to claim 9, wherein the magnetic disk apparatus further including a first electronic fuse and a second electronic fuse, the first electronic fuse being connected between the first external power supply and the power supply circuit, the first electronic fuse serving to enable, by being turned on, supply of the fourth power from the first external power supply to the power supply circuit and serving to cut off the supply of the fourth power by being turned off, the second electronic fuse being connected between the second external power supply and the power supply circuit, the second electronic fuse serving to enable, by being turned on, supply of the fifth power from the second external power supply to the power supply circuit and serving to cut off the supply of the fifth power by being turned off, and the control method further comprising turning on the first electronic fuse and the second electronic fuse in a state where either one or both of the supply of the fourth power and the supply of the fifth power are cut off.

11. The control method according to claim 8, further comprising receiving write data transmitted from the host device and storing the received write data in a first memory when communication with the host device is enabled during execution of the backup process.

12. The control method according to claim 8, further comprising transmitting information about a state of the magnetic disk apparatus to the host device when communication with the host device is enabled during execution of the backup process.

13. The control method according to claim 12, wherein the information about the state of the magnetic disk apparatus includes a progress status of the backup process and/or an operation mode of the magnetic disk apparatus.

14. The control method according to claim 12, further comprising terminating the backup process without waiting for a timeout of the backup process in response to receiving an instruction to interrupt the backup process from the host device after transmitting the information about the state of the magnetic disk apparatus to the host device.

\* \* \* \* \*